(12) United States Patent
Rajasekharan et al.

(10) Patent No.: US 8,810,968 B2
(45) Date of Patent: Aug. 19, 2014

(54) SLIDER WITH LUBRICANT CONTROL FEATURES

(71) Applicant: Seagate Technology LLC, Cupertino, CA (US)

(72) Inventors: Ajaykumar Rajasekharan, Bloomington, MN (US); Gary J. Kunkel, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/716,472

(22) Filed: Dec. 17, 2012

(65) Prior Publication Data

US 2014/0168820 A1 Jun. 19, 2014

(51) Int. Cl.
*G11B 5/60* (2006.01)

(52) U.S. Cl.
CPC .................................. *G11B 5/6082* (2013.01)
USPC .................... 360/235.7; 360/236.1; 360/236.3

(58) Field of Classification Search
USPC ............................ 360/235.7, 236.1, 236.3, 237
See application file for complete search history.

(56) References Cited

U.S. PATENT DOCUMENTS

| | | | | |
|---|---|---|---|---|
| 5,267,104 A * | 11/1993 | Albrecht et al. | ............ | 360/99.18 |
| 5,285,337 A * | 2/1994 | Best et al. | .................. | 360/99.18 |
| 5,587,858 A * | 12/1996 | Dorius et al. | ............. | 360/236.3 |
| 6,424,493 B1 * | 7/2002 | Matsumoto et al. | ....... | 360/235.5 |
| 6,424,494 B1 * | 7/2002 | Koishi | ........................ | 360/235.6 |
| 6,504,682 B1 * | 1/2003 | Sannino et al. | ............ | 360/235.8 |
| 6,590,746 B2 * | 7/2003 | Kang et al. | .................. | 360/236.3 |
| 6,594,113 B2 * | 7/2003 | Rao et al. | ..................... | 360/235.8 |
| 6,661,611 B1 * | 12/2003 | Sannino et al. | ............ | 360/236.3 |
| 6,661,612 B1 * | 12/2003 | Peng | ........................... | 360/236.3 |
| 6,710,976 B2 * | 3/2004 | Chapin et al. | .............. | 360/235.8 |
| 6,744,599 B1 * | 6/2004 | Peng et al. | ................. | 360/236.2 |
| 6,747,847 B2 * | 6/2004 | Stoebe et al. | .............. | 360/235.8 |
| 7,019,945 B1 * | 3/2006 | Peng et al. | ................. | 360/235.7 |
| 7,227,723 B2 | 6/2007 | Nath et al. | | |
| 7,333,297 B2 * | 2/2008 | Park | ........................... | 360/235.5 |
| 7,408,742 B2 * | 8/2008 | Kameyama | ............... | 360/235.8 |
| 7,502,202 B2 * | 3/2009 | Takahashi | ................. | 360/236.3 |
| 7,599,149 B2 * | 10/2009 | Kameyama | ............... | 360/236.3 |
| 7,936,538 B1 * | 5/2011 | Zhang et al. | ............... | 360/236.1 |
| 7,961,433 B2 | 6/2011 | Zheng et al. | | |
| 8,081,400 B1 | 12/2011 | Hu | | |
| 8,089,729 B2 | 1/2012 | Huang | | |
| 8,116,037 B2 * | 2/2012 | Kohira et al. | .............. | 360/235.7 |
| 8,169,744 B2 | 5/2012 | Dorius | | |
| 8,174,794 B2 | 5/2012 | Dorius | | |
| 8,199,435 B2 | 6/2012 | Fong et al. | | |
| 2003/0103293 A1 * | 6/2003 | Nakano et al. | ............ | 360/236.3 |
| 2003/0169535 A1 * | 9/2003 | Boutaghou | ................ | 360/236.5 |
| 2005/0231852 A1 * | 10/2005 | Tian et al. | .................. | 360/235.8 |
| 2006/0221502 A1 * | 10/2006 | Watanabe et al. | .......... | 360/235.8 |
| 2008/0123220 A1 * | 5/2008 | Kajitani | ..................... | 360/236.3 |

* cited by examiner

*Primary Examiner* — Brian Miller
(74) *Attorney, Agent, or Firm* — Leanne Taveggia Farrell; Westman, Champlin & Koehler, P.A.

(57) ABSTRACT

A slider that minimizes lubricant accumulation includes bearing surfaces that provide above ambient fluid pressure, a cavity located between two bearing surfaces and at least one step feature that is spaced apart from the bearing surfaces and is located in and protrudes from a floor of the cavity at a height that is less than a height of the bearing surfaces. The at least one step feature includes surfaces configured to diverge and converge airflow in the cavity.

18 Claims, 9 Drawing Sheets

SLIDER WITH LUBRICANT CONTROL FEATURES

BACKGROUND

Lubricant acts as a protective coating on the surface of data storage media to prevent corrosion to its magnetic layers. During data storage device operation, a slider, having transducer elements, flies over the data storage medium and interacts with the coating of lubricant on the surface. One common effect of the interaction between the slider and the lubricant includes mechanical lube pickup due to the lubricant ripping off the storage medium under high air-shear at the trailing edge of the slider.

The discussion above is merely provided for general background information and is not intended to be used as an aid in determining the scope of the claimed subject matter.

SUMMARY

A slider is provided that minimizes lubricant accumulation. The slider includes a slider body having an outer side edge, an inner side edge, a trailing edge, a leading edge, an outer rail positioned adjacent to the outer side edge of the slider body, an inner rail positioned adjacent to the inner side edge of the slider body and a center rail positioned between and spaced apart from the outer rail and the inner rail. The slider further includes first and second nozzle features each having a divergent portion and a convergent portion. The first nozzle feature is positioned between and separated from the outer rail and the center rail. The second nozzle feature is positioned between and separated from the inner rail and the center rail. Each nozzle feature is located a spaced distance from the trailing edge and the convergent portions are located in closer proximity to the trailing edge than the divergent portions.

A method of minimizing lubricant accumulation on the slider includes preventing fluid stagnation zones from occurring near a trailing edge of the slider body by locating the first nozzle feature on the cavity surface of the first cavity and locating the second nozzle feature on the cavity surface of the second cavity.

This Summary is provided to introduce a selection of concepts in a simplified form and are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments described herein include a slider having a slider body with a trailing edge and a leading edge. To minimize the accumulation of lubricant on the slider body from the data storage medium, nozzle features are included on the bottom of the slider body. Each nozzle feature includes both a convergent portion and a divergent portion. The convergent portions are located in closer proximity to the trailing edge than the divergent portions.

Figure 1:
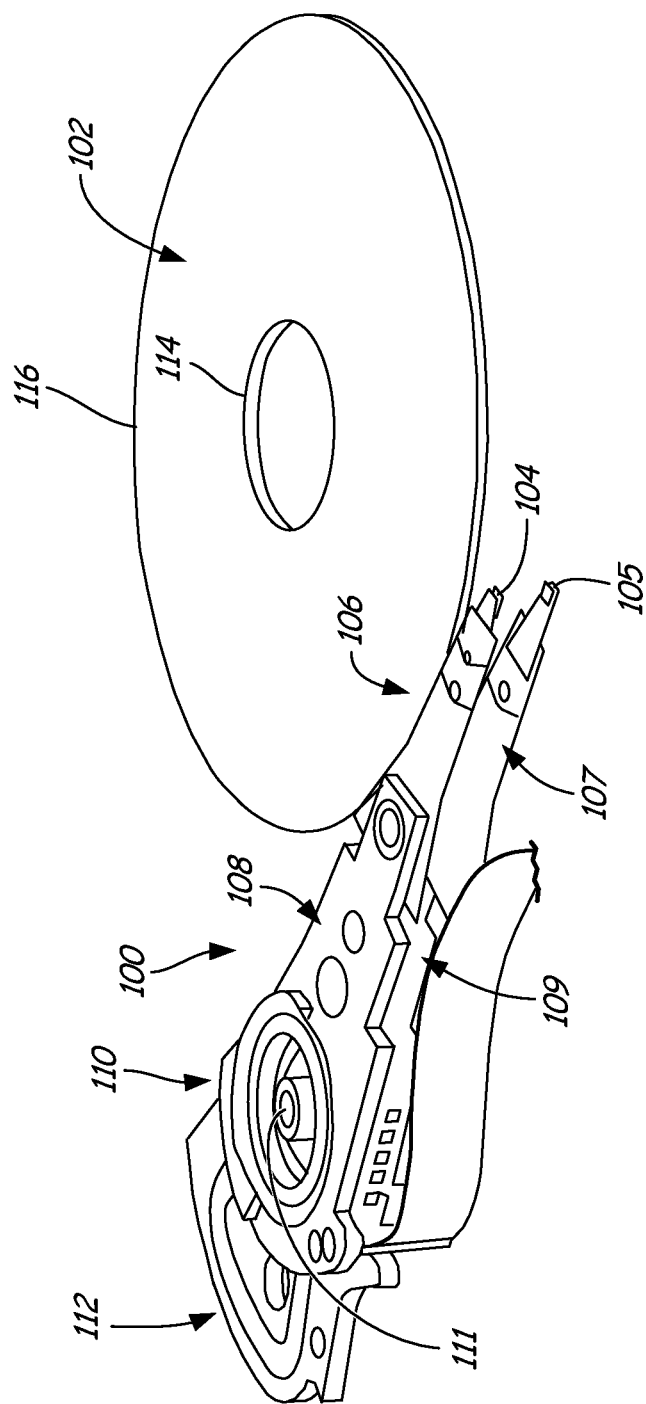
FIG. 1 illustrates a perspective view of exemplary components of a data storage device including a head stack assembly and a data storage medium.

FIG. 1 illustrates a perspective view of exemplary components of a data storage device including a head stack assembly 100 and date storage medium 102. Medium 102 stores information on a plurality of circular, concentric data tracks and is mountable to a spindle motor assembly that can rotate medium 102 and cause its data surfaces to pass under respective bearing slider surfaces. As illustrated, each surface of medium 102 has an associated header or slider 104 and 105, which carries transducers that communicate with a surface of medium 102.

Each slider 104 and 105 is supported by a head gimbal assembly (HGA) 106 and 107, which are in turn attached to an actuator arm 108 and 109 of an actuator mechanism 110 to form a Head Stack Assembly (HSA) 100. Actuator mechanism 110 is rotated about a shaft 111 by a voice coil motor 112, which is controlled by servo control circuitry. Voice coil motor 112 rotates actuator mechanism 110 to position sliders 104 and 105 relative to desired data tracks between an inner diameter 114 and an outer diameter 116 of medium 102.

Before describing detailed embodiments of sliders that have lubricant control features, an overview of lubricant accumulation is discussed. Lubricant on a surface of a storage medium or rotating disc acts as a protective coating for preventing corrosion to the magnetic layers lying beneath its surface. During the operation of a data storage device, the bearing of the slider flies over the storage medium or disc. In this process, the bearing interacts with the lubricant coating on the medium or disc, the effects of which can be seen as various signatures on the head-medium interface. Some of these interactions are mechanically driven due to the shear on the medium, such as air-shear. One common signature is due to the mechanical lube pickup when the lubricant rips off the disc under high air-shear at the trailing edge (TE) of the slider and then subsequently pulls through the TE of the slider because of the existing backflow in that region (i.e., negative pressure gradients at the TE). The lube that enters the slider in this manner can accumulate in stagnation or low-velocity zones and can cause significant read/write performance disruptions. Although the reverse flow from the TE of the slider should not be eliminated because of strategies for forming negative pressure in the cavities of the air-bearing, the bearing features can be tailored to control the forward and reverse flow on the slider and minimize lube accumulation regions. This disclosure focuses on one such feature, namely, an in-plane nozzle-like feature for mitigating the effect of the lube flow from the TE and reducing accumulation zones.

Figure 2:
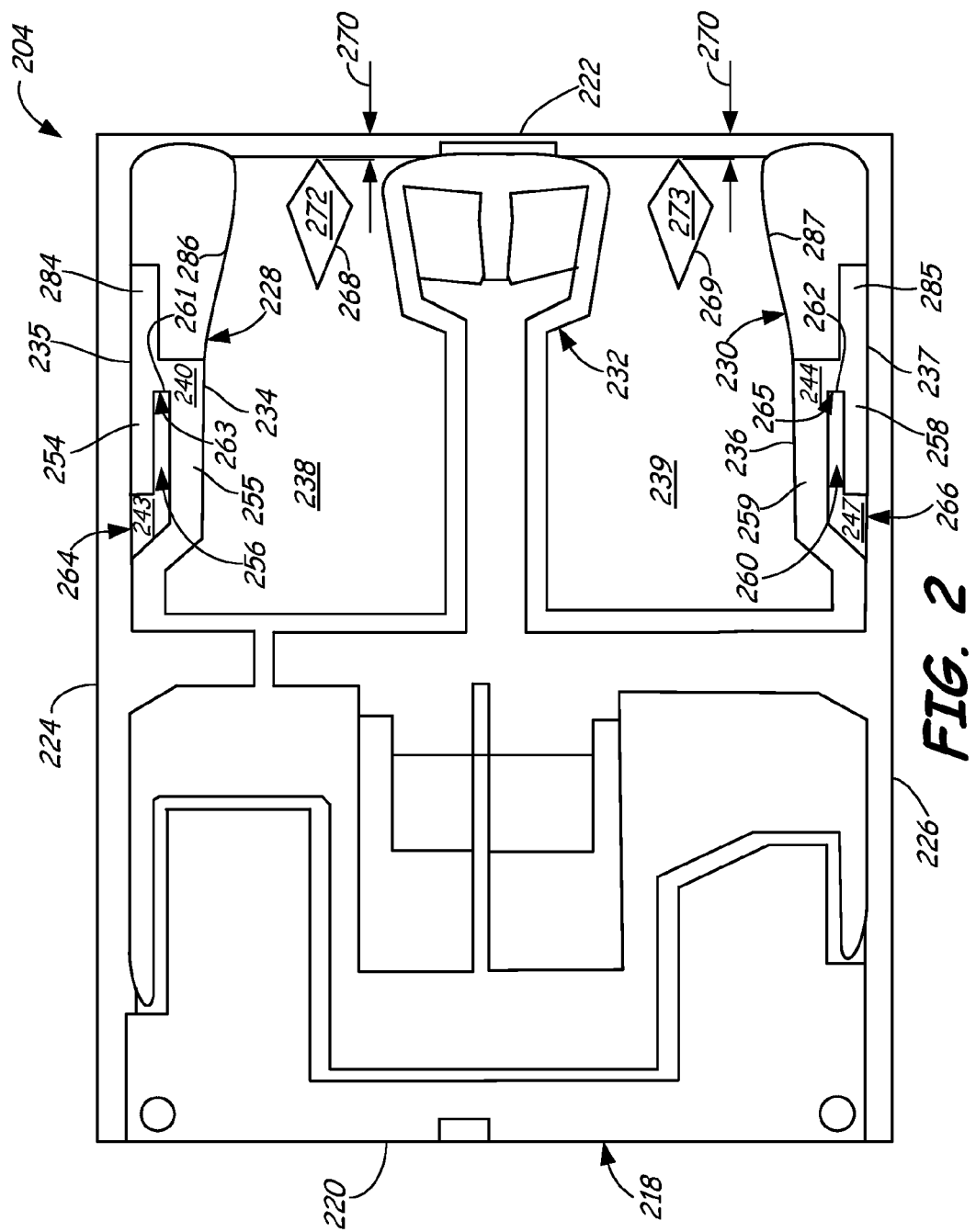
FIG. 2 illustrates an enlarged bottom plan view of a slider according to one embodiment.

FIG. 2 illustrates an enlarged bottom plan view of a slider 204 under one embodiment. Slider 204 includes a slider body 218 having a leading edge 220, a trailing edge 222, an outer side edge 224 and an inner side edge 226. Edge 224 is defined as an outer side edge because it is oriented towards the outer diameter of a data storage medium when the slider 204 is attached to an HSA, such as HSA 100 illustrated in FIG. 1. Edge 226 is defined as an inner side edge because it is oriented towards the inner diameter of a data storage medium when the slider is attached to an HSA, such as HSA 100 illustrated in FIG. 1.

Slider 204 includes an outer rail 228, an inner rail 230 and a center rail 232. Outer rail 228 has an inner edge 234 and an outer edge 235. Outer rail 228 is positioned between trailing edge 222 and leading edge 220 and is adjacent outer side edge 224 of slider body 218. Inner rail 230 has an inner edge 236 and an outer edge 237. Inner rail 230 is positioned between trailing edge 222 and leading edge 220 and is adjacent inner side edge 226 of slider body 218. Center rail 232 is also positioned between trailing edge 222 and leading edge 220 of slider body 218 and positioned between and spaced apart from outer rail 228 and inner rail 230. Defined between inner edge 234 of outer rail 228 and an edge of center rail 232 is a first cavity having a cavity surface or floor 238. Defined between inner edge 236 of inner rail 230 and an edge of center rail 232 is a second cavity having a cavity surface of floor 239. A portion of each of outer rail 228, inner rail 230 and center rail 232 includes a bearing surface, while other portions of each of outer rail 228, inner rail 230 and center rail 232 include step surfaces. Outer rail 228, inner rail 230 and center rail 232 all protrude from cavity surfaces or cavity floors 238 and 239.

Figure 3:
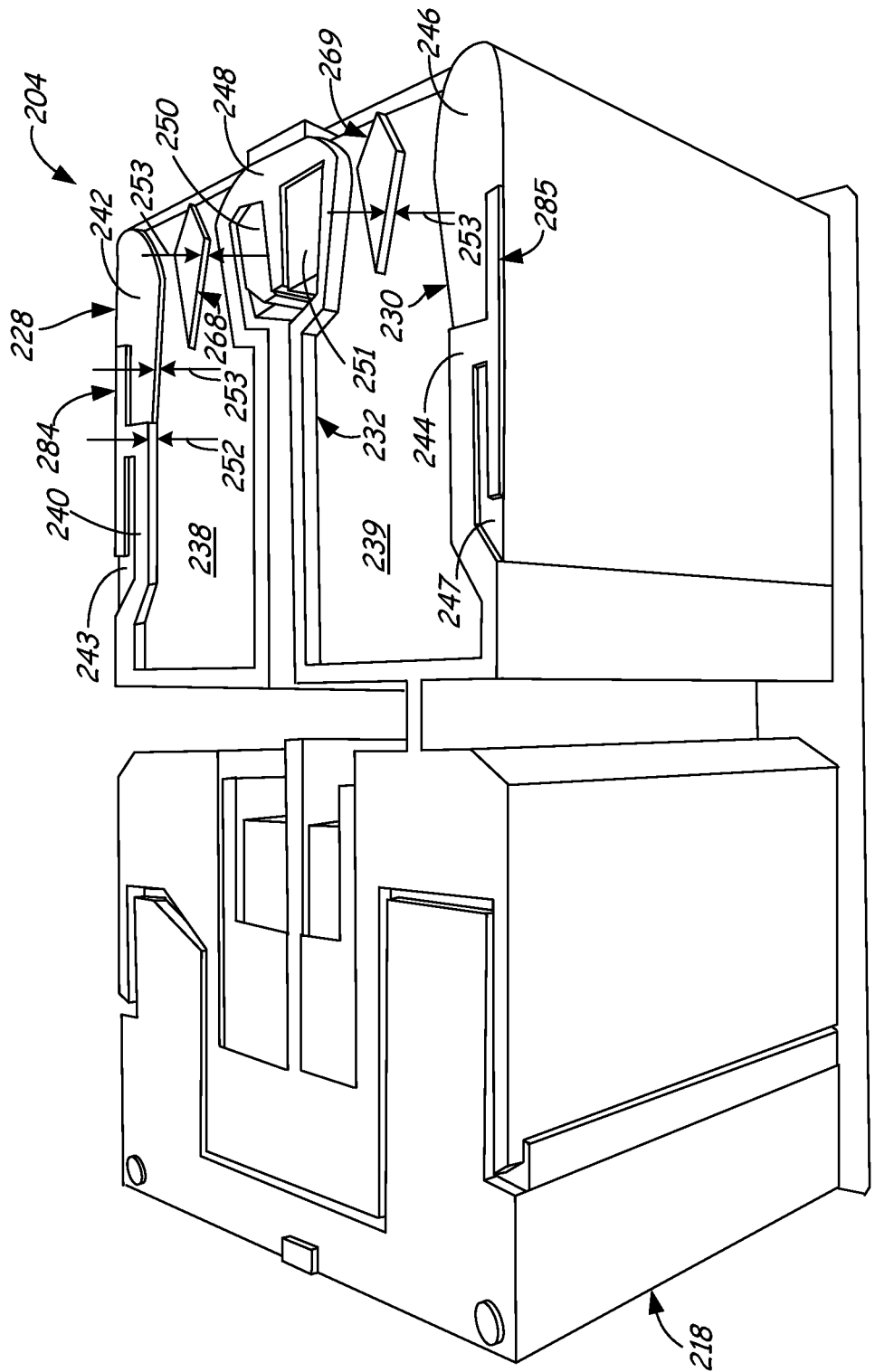
FIG. 3 illustrates an enlarged bottom perspective view of the slider illustrated in FIG. 2.

FIG. 3 illustrates an enlarged bottom perspective view of slider 204. As illustrated, outer rail 228 includes bearing surface 240 and step surfaces 242 and 243. Inner rail 230 includes bearing surface 244 and step surfaces 246 and 247. Center rail 232 includes bearing surface 248 and step surfaces 250 and 251. Bearing surfaces 240, 244 and 248 are defined by a bearing surface height 252. Bearing surface height 252 is the distance from which bearing surfaces 240, 244 and 248 of outer rail 228, inner rail 230 and center rail 232 protrude from cavity surfaces 238 and 239 of slider body 218. Step surfaces 242, 243, 246, 247, 250 and 251 are defined by a step surface height 253. Step surface height 253 is the distance from which step surfaces 242, 243, 246, 247, 250 and 251 protrude from cavity surfaces 238 and 239. As illustrated, bearing surface height 252 is greater than step surface height 253.

With reference back to FIG. 2, bearing surface 240 of outer rail 228 includes an outer leg 254 and an inner leg 255. Outer leg 254, inner leg 255 and step surface 243 together define an outer rail channel 256. Bearing surface 244 of inner rail 230 includes an outer leg 258 and an inner leg 259. Outer leg 258, inner leg 259 and step surface 247 define an inner rail channel 260. In one embodiment, outer leg 254 and inner leg 255 of outer rail 228 are coupled together at an outer channel dam 261 (FIG. 2). In another embodiment, outer leg 258 and inner leg 259 of inner rail 230 are coupled together at an inner channel dam 262 (FIG. 2).

Outer rail channel 261 includes a first end 263 (FIG. 2) and a second end 264 (FIG. 2). First end 263 of outer rail channel 256 is located at outer channel dam 261, while second end 264 of outer rail channel 261 is in fluidic communication with outer side edge 224 of slider body 218. Inner rail channel 260 includes a first end 265 (FIG. 2) and a second end 266 (FIG. 2). First end 265 of inner rail channel 260 is located at inner channel dam 262. Second end 266 of inner rail channel 260 is in fluidic communication with inner side edge 226 of slider body 218.

Bearing surface 240 located at bearing surface height 252 of outer rail 228 is an outer pressurization surface having an above-ambient fluid pressure when slider 204 is in flight. Airflow (or other type of fluid) enters outer rail channel 256 at second end 264. Airflow is dammed by outer channel dam 261 and provides bearing surface 240 or the outer pressurization surface with the above-ambient fluid pressure. Bearing surface 244 located at bearing surface height 252 of inner rail 230 is an inner pressurization surface having an above-ambient fluid pressure when slider 204 is in flight. Airflow (or other type of fluid) enters inner rail channel 260 at second end 266. Air is dammed by inner channel dam 262 and provides bearing surface 244 or the inner pressurization surface with the above-ambient fluid pressure. While an above-ambient fluid pressure at the outer pressurization surface 240 and at the inner pressurization surface 244 provides slider body 218 with the desired flying stiffness, it also creates backflow in cavity surfaces 238 and 239 and thereby negative pressure gradients at trailing edge 222. As described above, negative pressure gradients at trailing edge 222 can cause lubricant from the surface of a data storage medium to pull through trailing edge 222 and accumulate in stagnation or low-velocity zones. Therefore, slider 204 includes nozzle features for reducing lubricant accumulation zones.

As illustrated in FIGS. 2 and 3, slider 204 includes a nozzle feature or step feature 268 in the first cavity defined by cavity surface 238 and a nozzle feature or step feature 269 in the second cavity defined by cavity surface 239. Nozzle features 268 and 269 are located a spaced distance 270 from trailing edge 222. Nozzle feature 268 is located separate from and between outer rail 228 and center rail 232 and includes step surface 272. Nozzle feature 269 is located separate from and between inner rail 230 and center rail 232 and includes step surface 273. Like step surfaces 242, 243, 246, 247, 250 and 251, step surfaces 272 and 273 protrude from cavity surfaces 238 and 239 by step surface height 253.

Figure 4:
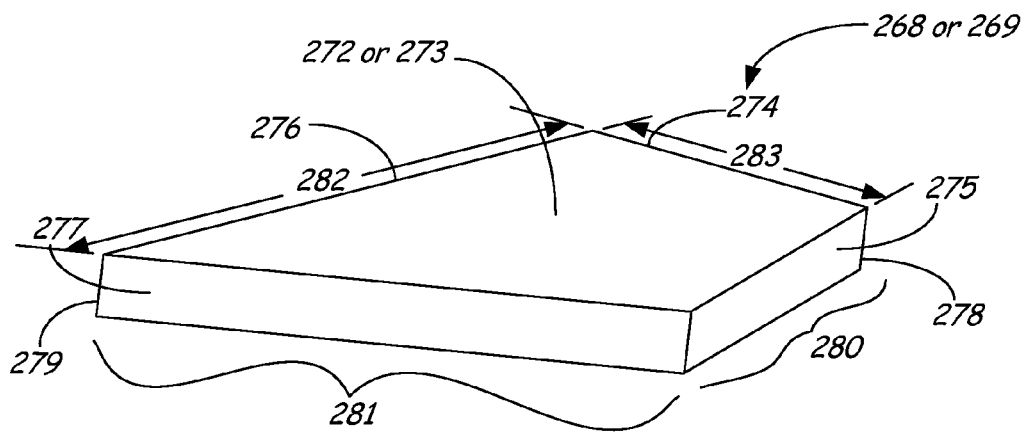
FIG. 4 is an enlarged perspective view of one of the nozzle features illustrated in FIGS. 2 and 3.

FIG. 4 illustrates an enlarged perspective view of either nozzle feature 268 or nozzle feature 269. Nozzle features 268 and 269 are rhombus-like in shape and include four sides 274, 275, 276 and 277. Sides 274 and 275 intersect to form a trailing edge 278 and sides 276 and 277 intersect to form a leading edge 279. Together side 274, side 275 and trailing edge 278 form a convergent portion 280 and together side 276, side 277 and leading edge 279 form a divergent portion 281. Trailing edge 278 and therefore convergent portion 280 of nozzle features 268 and 269 are located in closer proximity to trailing edge 222 of slider 204 than leading edge 279 and therefore divergent portion 281. Furthermore, as illustrated in FIGS. 2-4, sides 276 and 277 of divergent portion 281 includes lengths 282 that are greater than lengths 283 of sides 274 and 275 of convergent portion 280.

Figure 5:
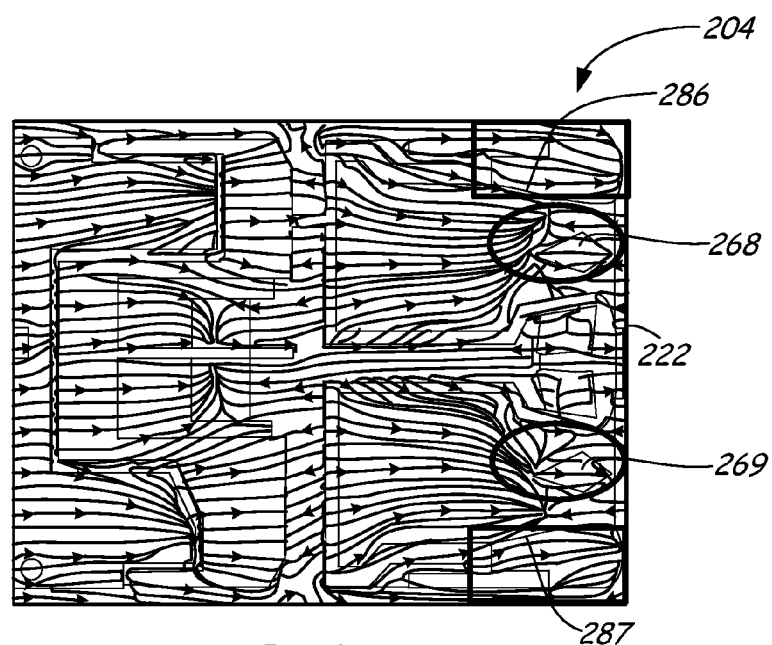
FIG. 5 is a bottom plan view of the slider illustrated in FIG. 2 including streamlines of airflow.

FIG. 5 illustrates exemplary streamlines of airflow in the bottom plan view of slider 204. Divergent portion 281 of nozzle features 268 and 269 curls the backflow of fluid coming from trailing edge 222 back toward trailing edge 222. Convergent portion 280 of nozzle features 268 and 269 speed up or increase the velocity of the forward flow of fluid (i.e., airflow directed toward trailing edge 222) in the cavities. Both convergent portion 280 and divergent portion 281 act to prevent stagnation zones from occurring in the trailing edge part of slider body 218 and therefore prevent lubricant accumulation. As illustrated in the oval circles illustrated in FIG. 5, stagnation regions are broken by nozzle features 268 and 269 and actually reverse the backflow to go back toward trailing edge 222. In addition and as illustrated in the rectangular boxes illustrated in FIG. 5, more flow travels toward trailing edge 222 with the use of nozzle features 268 and 269 and stepper features 286 and 287.

As illustrated in FIGS. 2 and 3, slider 204 also includes skew-invariant bleeding stopper features 284 and 285. Stopper feature 284 is an extension of bearing surface 240 of outer rail 228 and stopper feature 285 is an extension of bearing surface 244 of inner rail 230 and therefore located at the same height 252 as bearing surfaces 240 and 244. More specifically, stopper feature 284 is an extension of outer leg 254 of outer rail 228 and stopper feature 285 is an extension of outer leg 248 of inner rail 230. Stopper feature 284 extends in alignment from outer leg 254 toward trailing edge 222 from outer channel dam 261 and is adjacent to outer edge 235 of outer rail 228. Stopper feature 285 extends in alignment from outer leg 258 toward trailing edge 222 from inner channel dam 262 and is adjacent outer edge 237 of inner rail 230. Stopper features 284 and 285 reduce bleeding due to the cross flow of fluid or air from the outer edges 235 and 237 of rails 228 and 230 or side edges 224 and 226 of slider body 218. In other words, stopper features 284 and 285 prevent fluid from outer edges 235 and 237 of outer rail 228 and inner rail 230 from interacting with nozzle features 268 and 269 so that nozzle feature 268 and 269 are allowed to function consistently across radial and skew angles with respect to a storage medium during a seek operation.

As illustrated in FIGS. 2 and 3, slider 204 also includes converging surfaces 286 and 287 on outer rail 228 and inner rail 230. Converging surface 286 is included as part of step surface 242 of outer rail 228 and converging surface 287 is included as part of step surface 246 of inner rail 230. More specifically, converging surfaces 286 and 287 shape the inner edges of stepper surfaces 242 and 246 to provide another converging surface for speeding up the upstream flow of fluid or air to trailing edge 222. As illustrated in FIG. 2, the converging surfaces 286 and 287 begin at the same distance from trailing edge 222 as convergent portion 280 of nozzle features 268 and 269.

Figure 6:
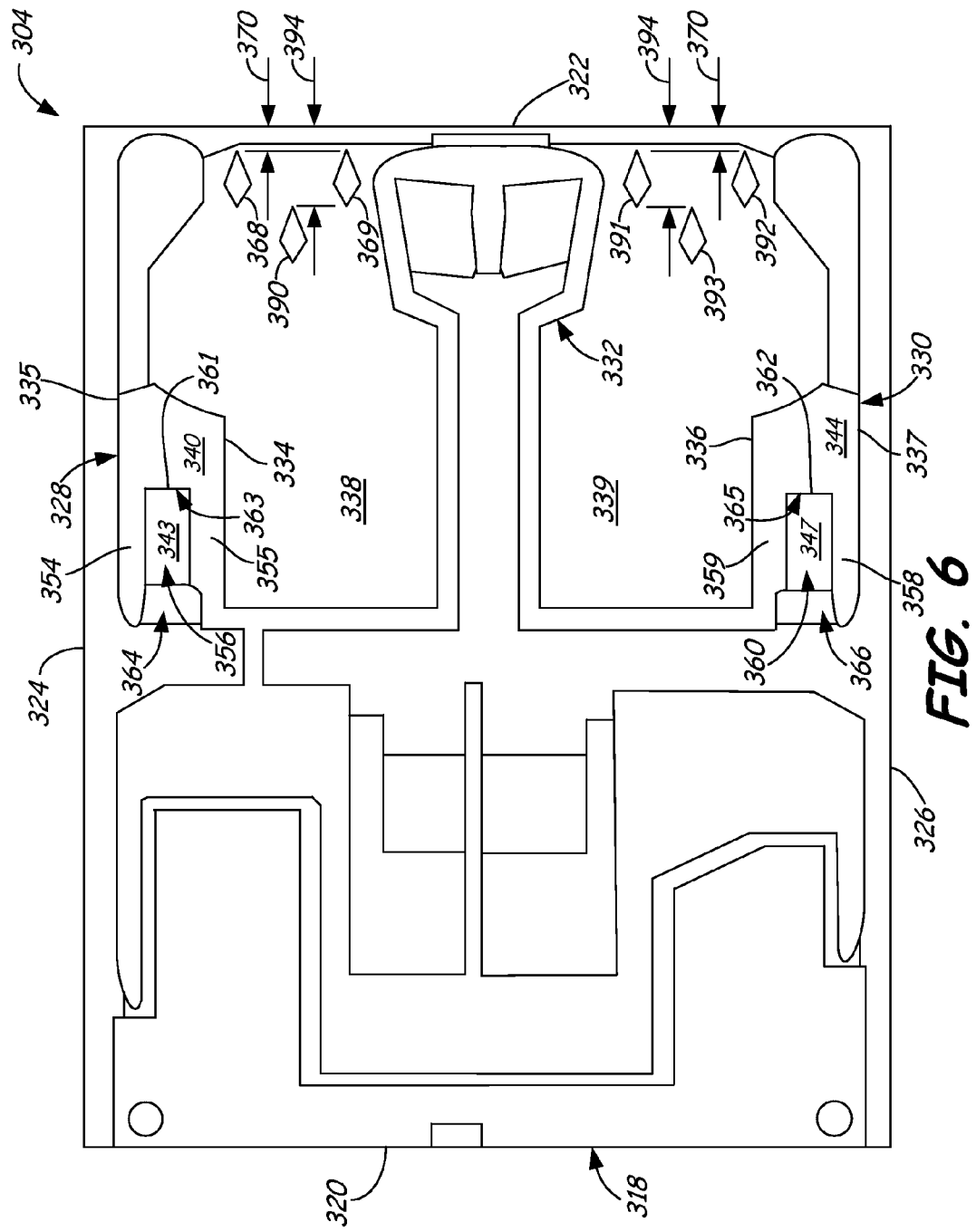
FIG. 6 illustrates a bottom plan view of a slider according to another embodiment.

FIG. 6 illustrates an enlarged bottom plan view of a slider 304 under one embodiment. Slider 304 includes a slider body 318 having a leading edge 320, a trailing edge 322, an outer side edge 324 and an inner side edge 326. Edge 324 is defined as an outer side edge because it is oriented towards the outer diameter of a data storage medium when the slider 304 is attached to an HSA, such as HSA 100 illustrated in FIG. 1. Edge 326 is defined as an inner side edge because it is oriented towards the inner diameter of a data storage medium when the slider is attached to an HSA, such as HSA 100 illustrated in FIG. 1.

Slider 304 includes an outer rail 328, an inner rail 330 and a center rail 332. Outer rail 328 has an inner edge 334 and an outer edge 335. Outer rail 328 is positioned between trailing edge 322 and leading edge 320 and is adjacent outer side edge 324 of slider body 318. Inner rail 330 has an inner edge 336 and an outer edge 337. Inner rail 330 is positioned between trailing edge 322 and leading edge 320 and is adjacent inner side edge 326 of slider body 318. Center rail 332 is also positioned between trailing edge 322 and leading edge 320 of slider body 318 and positioned between and spaced apart outer rail 328 and inner rail 330. Defined between inner edge 334 of outer rail 328 and an edge of center rail 332 is a first cavity having a cavity surface or floor 338. Defined between inner edge 336 of inner rail 330 and an edge of center rail 332 is a second cavity having a cavity surface or floor 339. A portion of each of outer rail 328, inner rail 330 and center rail 332 includes a bearing surface, while other portions of each of outer rail 328, inner rail 330 and center rail 332 include step surfaces. Outer rail 328, inner rail 330 and center rail 332 all protrude from cavity surfaces or cavity floors 338 and 339.

Figure 7:
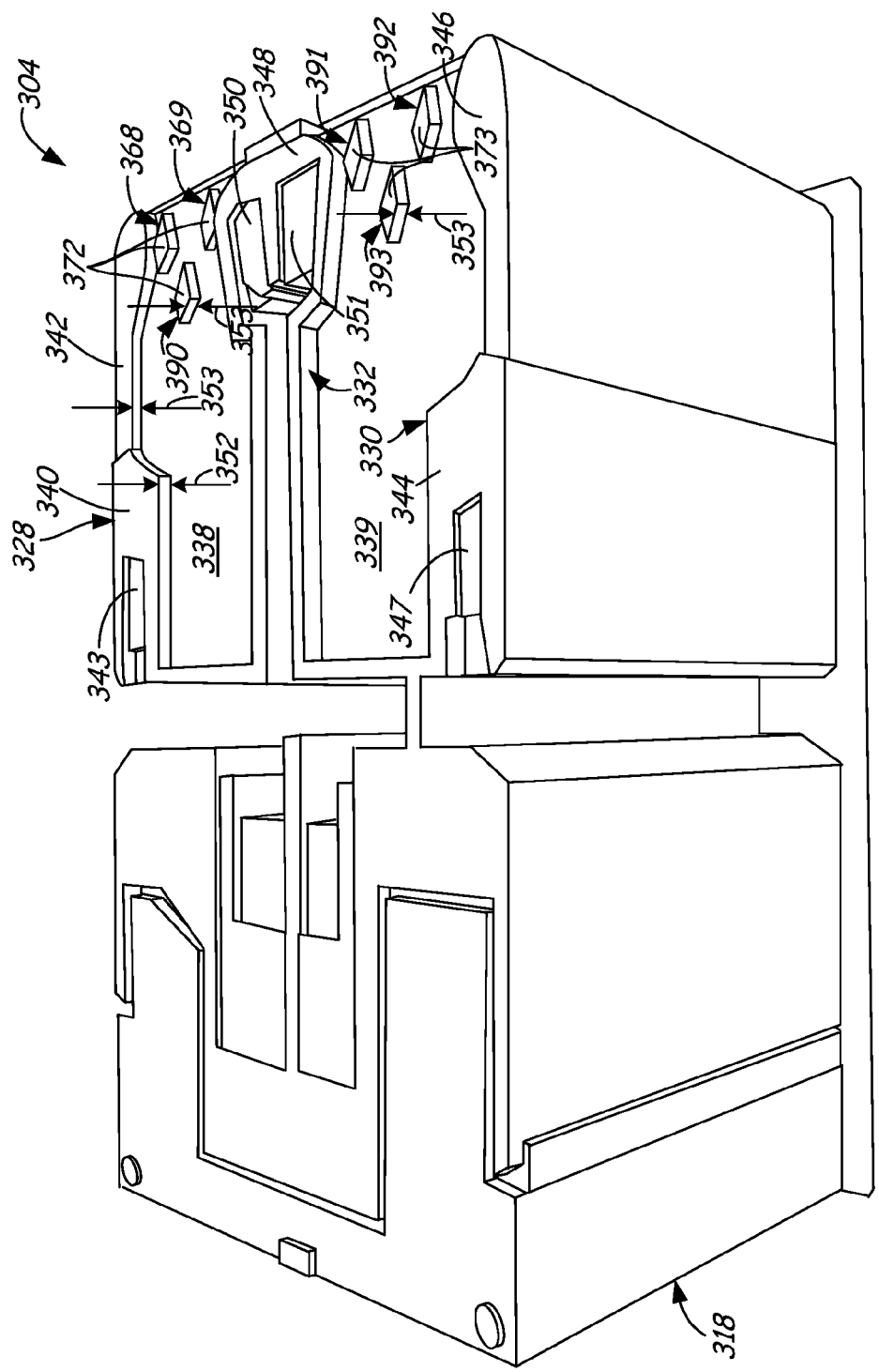
FIG. 7 illustrates a bottom perspective view of the slider illustrated in FIG. 6.

FIG. 7 illustrates an enlarged bottom perspective view of slider 304. As illustrated, outer rail 328 includes bearing surface 340 and step surfaces 342 and 343. Inner rail 330 includes bearing surface 344 and step surfaces 346 and 347. Center rail 332 includes bearing surface 348 and step surfaces 350 and 351. Bearing surfaces 340, 344 and 348 are defined by a bearing surface height 352. Bearing surface height 352 is the distance from which bearing surfaces 340, 344 and 348 of outer rail 328, inner rail 330 and center rail 332 protrude from cavity surfaces 338 and 339 of slider body 318. Step surfaces 342, 343, 346, 347, 350 and 351 are defined by a step surface height 353. Step surface height 353 is the distance from which step surfaces 342, 343, 346, 347, 350 and 351 protrude from cavity surfaces 338 and 339. As illustrated, bearing surface height 352 is greater than step surface height 353.

With reference back to FIG. 6, bearing surface 340 of outer rail 328 includes an outer leg 354 and an inner leg 355. Outer leg 354, inner leg 355 and step surface 343 together define an outer rail channel 356. Bearing surface 344 of inner rail 330 includes an outer leg 358 and an inner leg 359. Outer leg 358, inner leg 359 and step surface 347 define an inner rail channel 360. In one embodiment, outer leg 354 and inner leg 355 of outer rail 328 are coupled together at an outer channel dam 361 (FIG. 6). In another embodiment, outer leg 358 and inner leg 359 of inner rail 330 are coupled together at an inner channel dam 362 (FIG. 6).

Outer rail channel 361 includes a first end 363 (FIG. 6) and a second end 364 (FIG. 6). First end 363 of outer rail channel 356 is located at outer channel dam 361, while second end 364 of outer rail channel 361 is in fluidic communication with outer side edge 324 of slider body 318. Inner rail channel 360 includes a first end 365 (FIG. 6) and a second end 366 (FIG. 6). First end 365 of inner rail channel 360 is located at inner channel dam 362. Second end 366 of inner rail channel 360 is in fluidic communication with inner side edge 326 of slider body 318.

Bearing surface 340 located at bearing surface height 352 of outer rail 328 is an outer pressurization surface having an above-ambient fluid pressure when slider 304 is in flight. Airflow (or other type of fluid) enters outer rail channel 356 at second end 364. Airflow is dammed by outer channel dam 361 and provides bearing surface 340 or the outer pressurization surface with the above-ambient fluid pressure. Bearing surface 344 located at bearing surface height 352 of inner rail 330 is an inner pressurization surface having an above-ambient fluid pressure when slider 304 is in flight. Airflow (or other type of fluid) enters inner rail channel 360 at second end 366. Air is dammed by inner channel dam 362 and provides bearing surface 344 or the inner pressurization surface with the above-ambient fluid pressure. While an above-ambient fluid pressure at the outer pressurization surface 340 and at the inner pressurization surface 344 provides slider body 318 with the desired flying stiffness, it also creates backflow in cavity surfaces 338 and 339 and thereby negative pressure gradients at trailing edge 322. As described above, negative pressure gradients at trailing edge 322 can cause lubricant from the surface of a data storage medium to pull through trailing edge 322 and accumulate in stagnation or low-velocity zones. Therefore, slider 304 includes a plurality of nozzle features for reducing lubricant accumulation zones.

As illustrated in FIGS. 6 and 7, slider 304 includes three nozzle features or step features 368, 369, 390 in the first cavity defined by cavity surface 338 and three nozzle features or step features 391, 392 and 393 in the second cavity defined by cavity surface 339. All six nozzle features 368, 369, 390, 391, 392 and 393 are located a spaced distance from trailing edge 322. For example, nozzle features 368, 369, 391 and 392 are located a spaced distance 370 from trailing edge 322, while nozzle features 390 and 393 are located a spaced distance 394 from trailing edge 322. Distance 394 is greater than distance 370. In this way, each of nozzle features 368, 369 and 390 define a point of a triangle and each of nozzle features 391, 392 and 393 define a point of a triangle. Nozzle features 268, 269 and 290 are separate from each other and are located separate from and between outer rail 328 and center rail 332 and include step surface 372 (FIG. 7). Nozzle features 391, 392 and 393 are separate from each other and are located separate from and between inner rail 330 and center rail 332 and include step surface 373 (FIG. 7) Like step surfaces 342, 343, 346, 347, 350 and 351, step surfaces 372 and 373 protrude from cavity surfaces 338 and 339 by step surface height 353 (FIG. 7).

Figure 8:
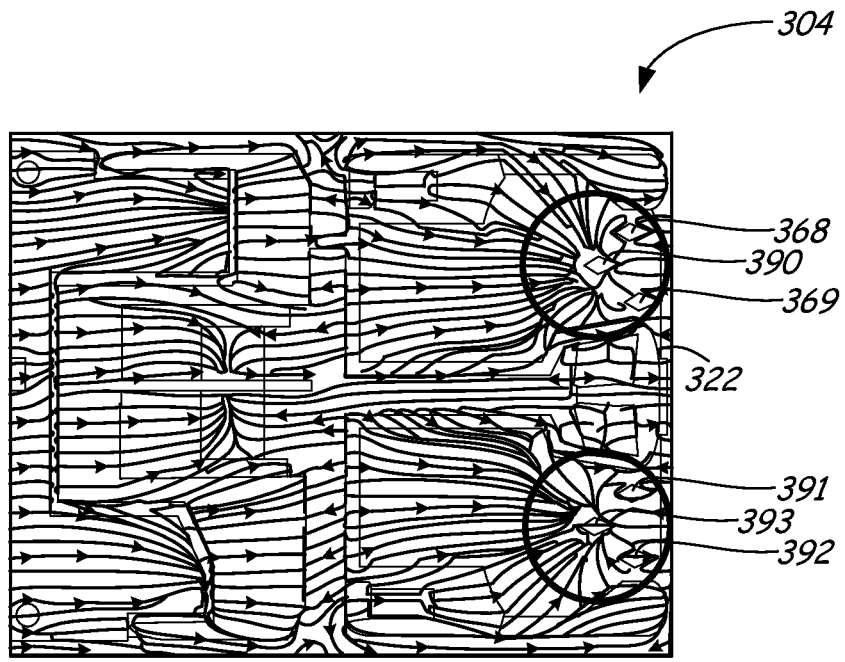
FIG. 8 illustrates a bottom plan view of the slider illustrated in FIG. 6 including streamlines of airflow.

Each of nozzle features 368, 369, 390, 391, 392 and 393 include a rhombus-like geometry similar to nozzle features 268 and 269 illustrated in FIG. 4. In particular, FIG. 8 illustrates exemplary streamlines of airflow in the bottom plan view of slider 304. As previously discussed, the divergent portions of nozzle features 368, 369, 390, 391, 392 and 393 curl the backflow of fluid coming from trailing edge 322 back toward trailing edge 322. The convergent portions of nozzle features 368, 369, 390, 391, 392 and 393 speed up or increase the velocity of the forward flow of fluid (i.e., airflow directed toward trailing edge 322) in the cavities. Both the divergent portions and convergent portions act to prevent stagnation zones from occurring in the trailing edge part of slider body 218 and therefore prevent lubricant accumulation. As illustrated in the circles illustrated in FIG. 8, stagnation regions are broken by nozzle features 368, 369, 390, 391, 392 and 393 and actually reverse the backflow to go back toward trailing edge 322.

Figure 9:
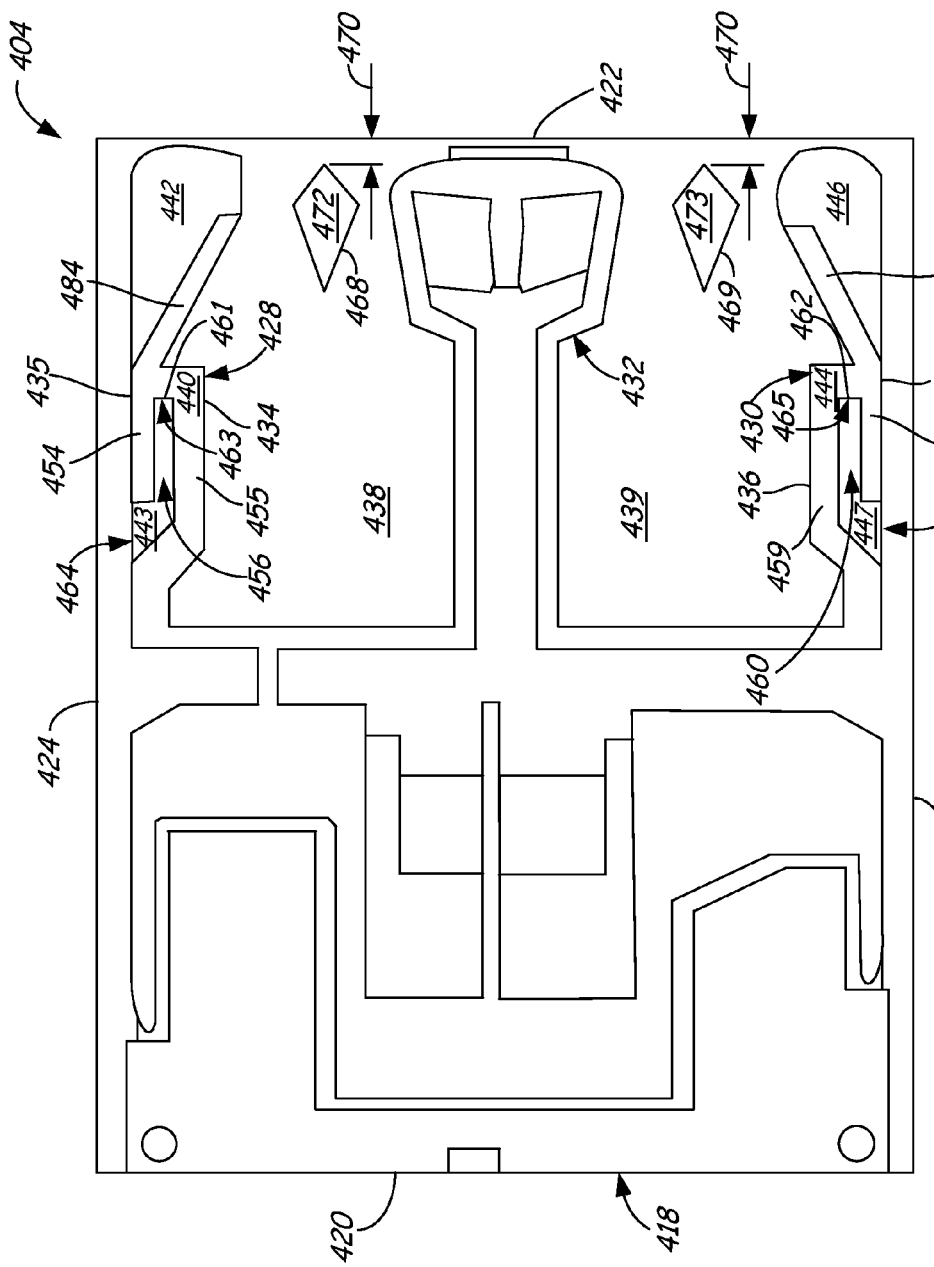
FIG. 9 illustrates a bottom plan view of a slider according to yet another embodiment.

FIG. 9 illustrates an enlarged bottom plan view of a slider 404 under yet another embodiment. Slider 404 includes a slider body 418 having a leading edge 420, a trailing edge 422, an outer side edge 424 and an inner side edge 426. Edge 424 is defined as an outer side edge because it is oriented towards the outer diameter of a data storage medium when the slider 404 is attached to an HSA, such as HSA 100 illustrated in FIG. 1. Edge 426 is defined as an inner side edge because it is oriented towards the inner diameter of a data storage medium when the slider is attached to an HSA, such as HSA 100 illustrated in FIG. 1.

Slider 404 includes an outer rail 428, an inner rail 430 and a center rail 432. Outer rail 428 has an inner edge 434 and an outer edge 435. Outer rail 428 is positioned between trailing edge 422 and leading edge 420 and is adjacent outer side edge 424 of slider body 418. Inner rail 430 has an inner edge 436 and an outer edge 437. Inner rail 430 is positioned between trailing edge 422 and leading edge 420 and is adjacent inner side edge 426 of slider body 418. Center rail 232 is also positioned between trailing edge 422 and leading edge 420 of slider body 418 and positioned between and spaced apart from outer rail 428 and inner rail 430. Defined between inner edge 434 of outer rail 428 and an edge of center rail 432 is a first cavity having a cavity surface or floor 438. Defined between inner edge 436 of inner rail 430 and an edge of center rail 432 is a second cavity having a cavity surface or floor 439. A portion of each of outer rail 428, inner rail 430 and center rail 432 includes a bearing surface, while other portions of each of outer rail 428, inner rail 430 and center rail 432 include step surfaces. Outer rail 428, inner rail 430 and center rail 432 all protrude from cavity surfaces or cavity floors 438 and 439.

Figure 10:
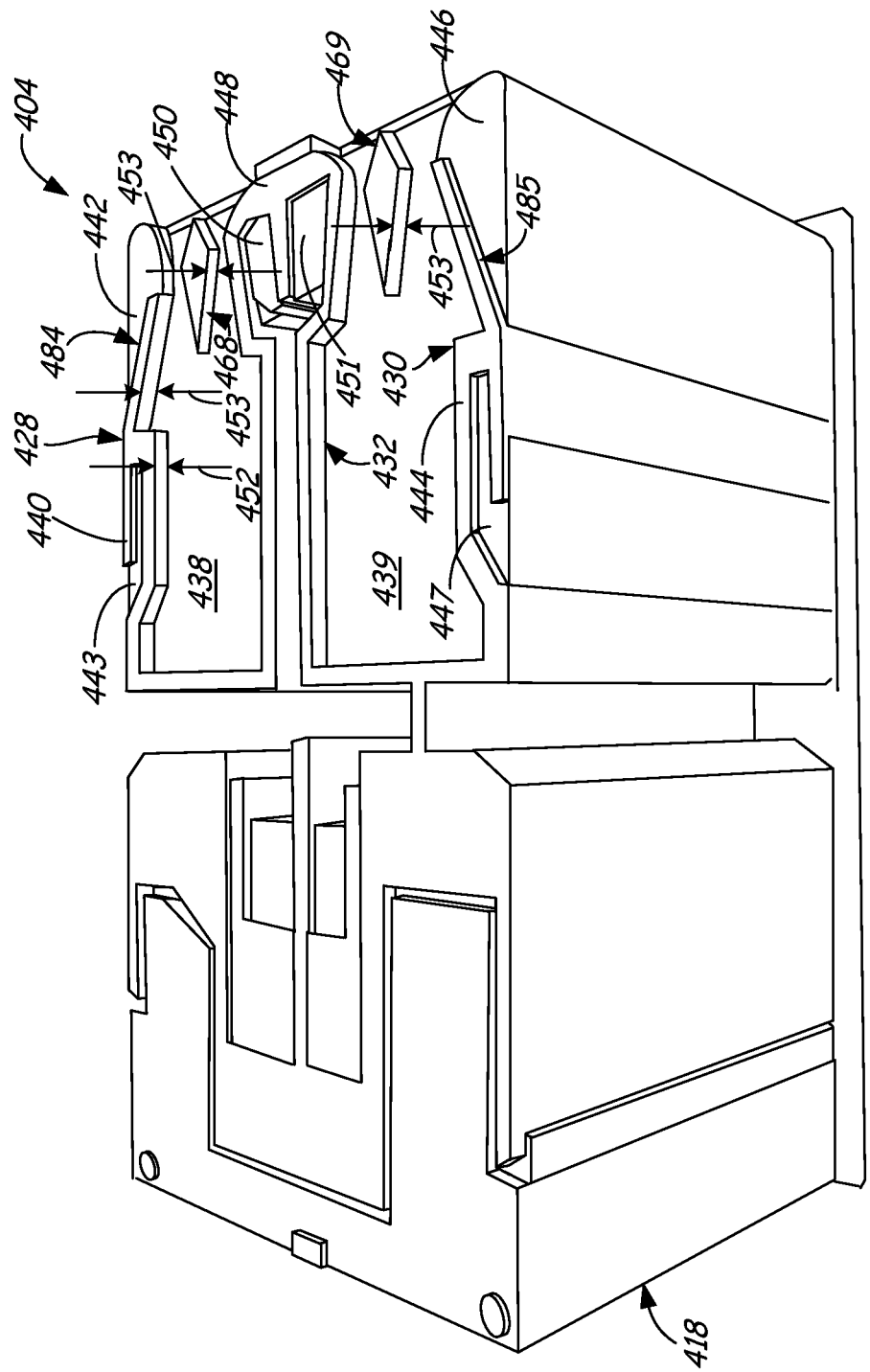
FIG. 10 illustrates a bottom perspective view of the slider illustrated in FIG. 9.

FIG. 10 illustrates an enlarged bottom perspective view of slider 404. As illustrated, outer rail 428 includes bearing surface 440 and step surfaces 442 and 443. Inner rail 430 includes bearing surface 444 and step surfaces 446 and 447. Center rail 432 includes bearing surface 448 and step surfaces 450 and 451. Bearing surfaces 440, 444 and 448 are defined by a bearing surface height 452. Bearing surface height 452 is the distance from which bearing surfaces 440, 444 and 448 of outer rail 428, inner rail 430 and center rail 432 protrude from cavity surfaces 438 and 439 of slider body 418. Step surfaces 442, 443, 446, 447, 450 and 451 are defined by a step surface height 453. Step surface height 453 is the distance from which step surfaces 442, 443, 446, 447, 450 and 451 protrude from cavity surfaces 438 and 439. As illustrated, bearing surface height 452 is greater than step surface height 453.

With reference back to FIG. 9, bearing surface 440 of outer rail 428 includes an outer leg 454 and an inner leg 455. Outer leg 454, inner leg 455 and step surface 443 together define an outer rail channel 456. Bearing surface 444 of inner rail 430 includes an outer leg 458 and an inner leg 459. Outer leg 458, inner leg 459 and step surface 447 define an inner rail channel 460. In one embodiment, outer leg 454 and inner leg 455 of outer rail 428 are coupled together at an outer channel dam 461 (FIG. 9). In another embodiment, outer leg 458 and inner leg 459 of inner rail 40 are coupled together at an inner channel dam 462 (FIG. 9).

Outer rail channel 461 includes a first end 463 (FIG. 9) and a second end 464 (FIG. 9). First end 463 of outer rail channel 456 is located at outer channel dam 461, while second end 464 of outer rail channel 461 is in fluidic communication with outer side edge 424 of slider body 418. Inner rail channel 460 includes a first end 465 (FIG. 9) and a second end 466 (FIG. 9). First end 465 of inner rail channel 460 is located at inner channel dam 462. Second end 466 of inner rail channel 460 is in fluidic communication with inner side edge 426 of slider body 418.

Bearing surface 440 located at bearing surface height 452 of outer rail 428 is an outer pressurization surface having an above-ambient fluid pressure when slider 404 is in flight. Airflow (or other type of fluid) enters outer rail channel 456 at second end 464. Airflow is dammed by outer channel dam 461 and provides bearing surface 440 or the outer pressurization surface with the above-ambient fluid pressure. Bearing surface 444 located at bearing surface height 452 of inner rail 40 is an inner pressurization surface having an above-ambient fluid pressure when slider 404 is in flight. Airflow (or other type of fluid) enters inner rail channel 460 at second end 466. Air is dammed by inner channel dam 462 and provides bearing surface 444 or the inner pressurization surface with the above-ambient fluid pressure. While an above-ambient fluid pressure at the outer pressurization surface 440 and at the inner pressurization surface 444 provides slider body 418 with the desired flying stiffness, it also creates backflow in cavity surfaces 438 and thereby negative pressure gradients at trailing edge 422. As described above, negative pressure gradients at trailing edge 422 can cause lubricant from the surface of a data storage medium to pull through trailing edge 422 and accumulate in stagnation or low-velocity zones. Therefore, slider 404 includes nozzle features for reducing lubricant accumulation zones.

As illustrated in FIGS. 9 and 10, slider 404 includes a nozzle feature or step feature 468 in the first cavity defined by cavity surface 438 and a nozzle feature or step feature 469 in the second cavity defined by cavity surface 439. Nozzle features 468 and 469 are located a spaced distance 470 from trailing edge 422. Nozzle feature 468 is located separate from and between outer rail 428 and center rail 432 and includes step surface 472. Nozzle feature 469 is located separate from and between inner rail 430 and center rail 432 and includes step surface 473. Like step surfaces 442, 443, 446, 447, 450 and 451, step surfaces 472 and 473 protrude from cavity surfaces 438 by step surface height 453 (FIG. 10).

Figure 11:
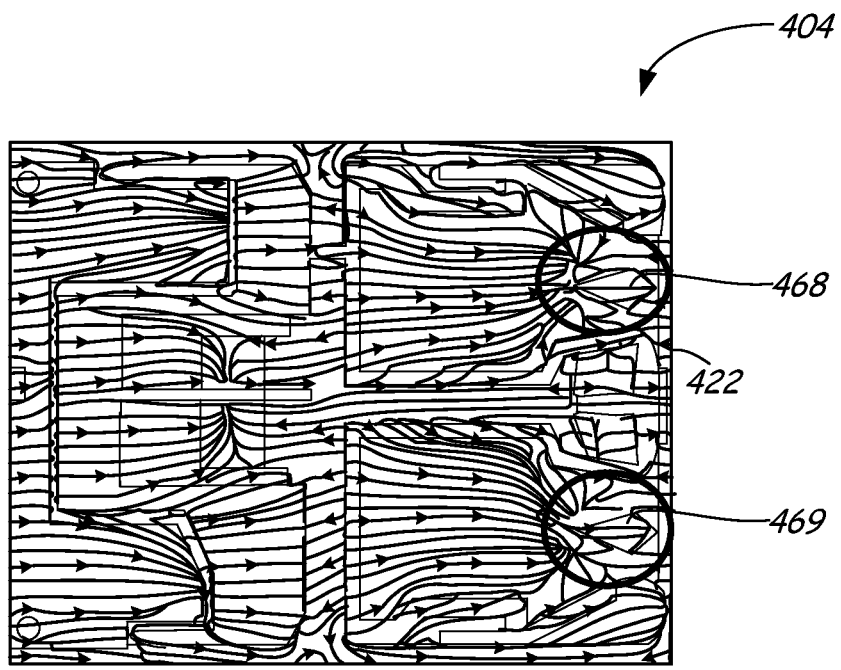
FIG. 11 illustrates a bottom plan view of the slider illustrated in FIG. 9 including streamlines of airflow.

Each of nozzle features 468 and 469 include a rhombus-like geometry and are substantially similar to nozzle features 268 and 269 illustrated in FIG. 4. In particular, FIG. 11 illustrates exemplary streamlines of airflow in the bottom plan view of slider 404. As previously discussed, the divergent portions of nozzle features 468 and 469 curl the backflow of fluid coming from trailing edge 422 back toward trailing edge 422. The convergent portions of nozzle features 468 and 469 speed up or increase the velocity of the forward flow of fluid (i.e., airflow directed toward trailing edge 422) in the cavities. Both the divergent portions and convergent portions act to prevent stagnation zones from occurring in the trailing edge part of slider body 418 and therefore prevent lubricant accumulation. As illustrated in the circles illustrated in FIG. 11, stagnation regions are broken by nozzle features 468 and 469 and actually reverse the backflow to go back toward trailing edge 422.

As illustrated in FIGS. 9 and 10, slider 404 also includes skew-invariant bleeding stopper features 484 and 485. Stopper feature 484 is an extension of bearing surface 440 of outer rail 428 and stopper feature 485 is an extension of bearing surface 444 of inner rail 430 and therefore located at the same height 452 as bearing surfaces 440 and 444. More specifically, stopper feature 484 is an extension of outer leg 454 of outer rail 428 and stopper feature 485 is an extension of outer leg 448 of inner rail 430. Rather than stopper features 484 and 485 extending in alignment from the outer legs 454 and 458 and toward trailing edge 422 from the outer channel dams 461 and 462 as described in regards to the FIGS. 2-5, stopper features 484 and 485 follow and are adjacent to inner edges 434 and 436 of outer and inner rails 428 and 430 from outer legs 454 and 458 toward trailing edge 422. Stopper features 484 and 485 reduce bleeding due to the cross flow of fluid or air from the outer edges 435 and 437 of rails 428 and 430 or side edges 424 and 426 of slider body 418. In other words, stopper features 484 and 485 prevent fluid from outer edges 435 and 437 of outer rail 428 and inner rail 430 from interacting with nozzle features 468 and 469 so that nozzle features 468 and 469 are allowed to function consistently across radial and skew angles with respect to a storage medium during a seek operation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A slider comprising:
   a slider body having an outer side edge, an inner side edge, a trailing edge and a leading edge;
   an outer rail positioned adjacent to the outer side edge of the slider body;
   an inner rail positioned adjacent to the inner side edge of the slider body;
   a center rail positioned between and spaced apart from the outer rail and the inner rail; and
   first and second nozzle features each having a divergent portion and a convergent portion, the first nozzle feature being positioned between and separated from the outer rail and the center rail and the second nozzle feature being positioned between and separated from the inner rail and the center rail, wherein each nozzle feature is located a spaced distance from the trailing edge and the convergent portions are located in closer proximity to the trailing edge than the divergent portions; and
   wherein the outer rail further comprises a first stopper feature and the inner rail further comprises a second stopper feature, the first and the second stopper features are configured to prevent fluid originating at outer edges of the outer rail and the inner rail from interacting with the first and second nozzle features.

2. The slider of claim 1, wherein the first nozzle feature comprises a plurality of separate first nozzle features and the second nozzle feature comprises a plurality of separate second nozzle features.

3. The slider of claim 2, wherein a portion of the plurality of first nozzle features and a portion of the plurality of second nozzle features are located a first spaced distance from the trailing edge and a remaining portion of the plurality of first nozzle features and a remaining portion of the plurality of second nozzle features are located a second spaced distance from the trailing edge, wherein the second spaced distance is greater than the first spaced distance.

4. The slider of claim 1, wherein a length of the divergent portion of each of first and second nozzle features is greater than a length of the convergent portion of each of first and second nozzle features.

5. The slider of claim 1, wherein the first and second nozzle features comprise a four sided rhombus shape that includes a leading edge where two of the sides intersect and a trailing edge where the other two of the sides intersect, wherein the trailing edges of the first and second nozzle features are located the spaced distance from the trailing edge of the slider.

6. The slider of claim 1, wherein the first and second nozzle features protrude from a cavity surface by a height that is substantially equal to a height of a portion of the outer rail, a portion of the inner rail and a portion of the center rail.

7. The slider of claim 1, wherein the first stopper is adjacent the outer edge of the outer rail and is located between the trailing edge of the slider and an outer channel dam of the outer rail that provides the outer rail with a bearing surface having above ambient fluid pressure.

8. The slider of claim 1, wherein the second stopper is adjacent the outer edge of the inner rail and is located between the trailing edge the slider and an inner channel dam of the inner rail that provides the inner rail with a bearing surface having above ambient fluid pressure.

9. A slider comprising:
   bearing surfaces that provide above ambient fluid pressure, wherein at least one first bearing surface is located adjacent to an outer side edge of the slider, at least one second bearing surface is located adjacent to an inner side edge of the slider and at least one third bearing surface is centrally located adjacent to a trailing edge of the slider;
   at least one cavity located between the at least one first bearing surface and the at least one second bearing surface; and
   at least two step features are spaced apart from the bearing surfaces and are located in and protrude from a floor of the at least one cavity at a height that is less than a height of the bearing surfaces, the at least one step feature includes surfaces configured to diverge and converge airflow in the cavity; and wherein the at least one first bearing surface includes a stopper feature that extends toward the trailing edge from the at least one first bearing surface and is configured to prevent fluid originating at the outer side edge of the slider from interacting with the at least two step features and wherein the at least one second bearing surface includes a stopper feature that extends toward the trailing edge from the at least one second bearing surface and is configured to prevent fluid originating at the inner side edge of the slider from interacting with the at least two step features.

10. The slider of claim 9, wherein each step feature comprises a four sided rhombus shape that includes a leading edge where two of the sides intersect and a trailing edge where the other two of the sides intersect.

11. The slider of claim 10, wherein the leading edge of each step feature and its two sides define a divergent portion.

12. The slider of claim 11, wherein the trailing edge of each step feature is located a spaced distance from the trailing edge of the slider and wherein the trailing edge of each step feature and its two sides define a convergent portion.

13. The slider of claim 12, wherein a length of the sides of the divergent portion are greater than a length of the sides of the convergent portion.

14. The slider of claim 9, wherein the at least one step feature comprises three separate step features.

15. The slider claim 14, wherein the first and second step features are located a first spaced distance from a trailing edge of the slider and the third step feature is located a second spaced distance from the trailing edge of the slider, the second spaced distance being greater than the first spaced distance.

16. A method of minimizing lubricant accumulation on a slider, the method comprising:

obtaining a slider body having an outer rail located adjacent to an outer side edge of the slider body, an inner rail located adjacent to an inner side edge of the slider body and a center rail located between the outer rail and the inner, wherein the center rail is separated from the outer rail by a first cavity having a cavity surface and the center rail is separated from the inner rail by a second cavity having a cavity surface;

preventing fluid stagnation zones from occurring near a trailing edge of the slider body by locating at least a first nozzle feature on the cavity surface of the first cavity and locating at least a second nozzle feature on the cavity surface of the second cavity, the first and second nozzle features are located a spaced distance from a trailing edge of the slider body and each have a divergent portion and a convergent portion, wherein the convergent portions are located in closer proximity to the trailing edge than the divergent portions; and preventing fluid that originated at the outer side edge and the inner side edge of the slider body from interacting with the first and second nozzle features by locating a first stopper feature on the outer rail and a second stopper feature on the inner rail, wherein the first stopper feature is adjacent an outer edge of the outer rail and is located between the trailing edge of the slider body and an outer channel dam of the outer rail that provides the outer rail with a bearing surface having above ambient fluid pressure and wherein the second stopper feature is adjacent an outer edge of the inner rail and is located between the trailing edge the slider and an inner channel dam of the inner rail that provides the inner rail with a bearing surface having above ambient fluid pressure.

17. The method of claim 16, further comprising increasing a velocity of fluid between the convergent portion of the first nozzle feature and the outer rail by including a converging surface on a stepper surface of the outer rail.

18. The method of claim 17, further comprising increasing a velocity of fluid between the convergent portion of the second nozzle feature and the inner rail by including a converging surface on a stepper surface of the inner rail.

\* \* \* \* \*